United States Patent Office 3,528,190
Patented Sept. 15, 1970

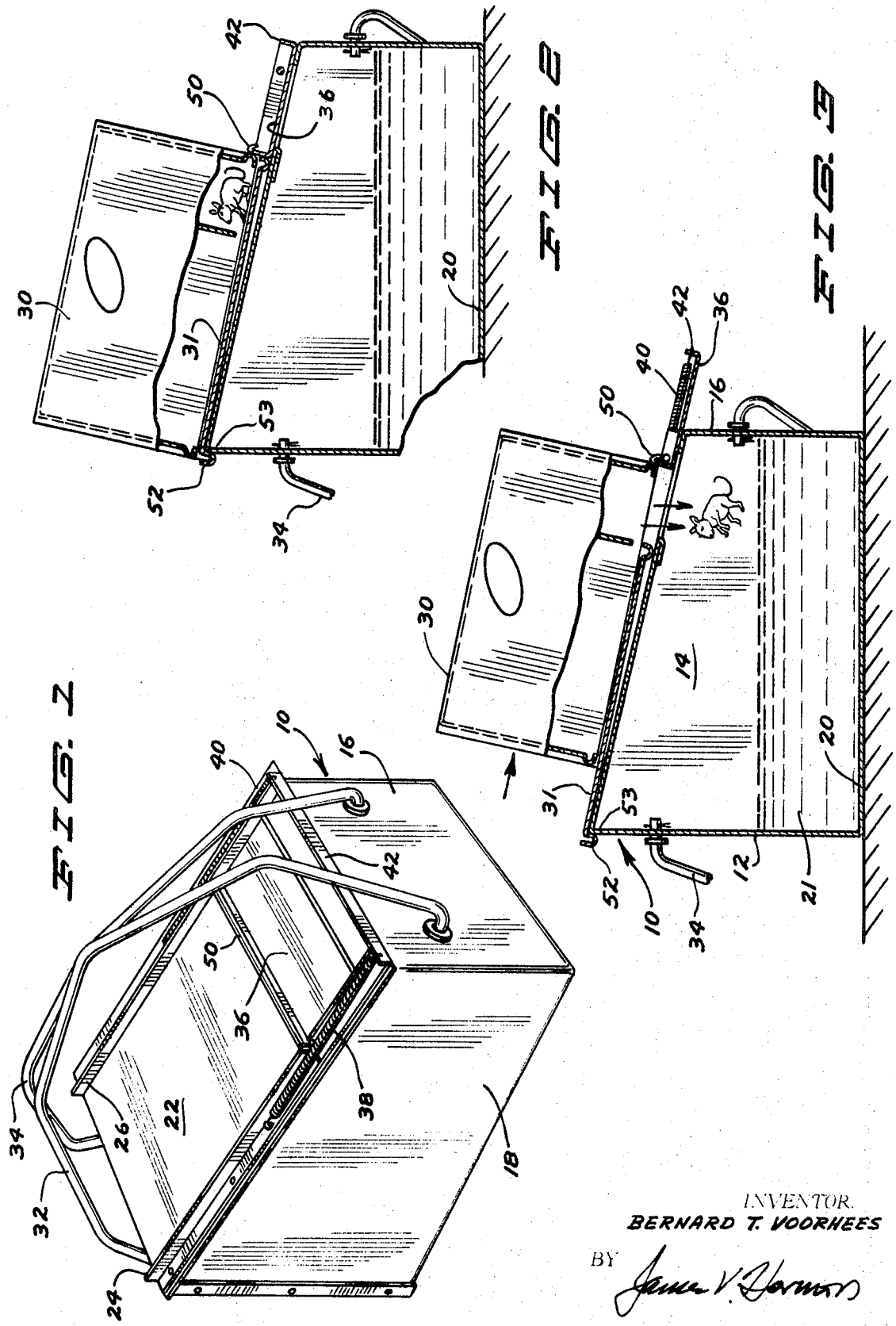

3,528,190
DEATH CHAMBER FOR RODENTS AND OTHER PESTS
Bernhard T. Voorhees, Roy, Utah, assignor to The Pillsbury Company, Minneapolis, Minn., a corporation of Delaware
Filed Dec. 27, 1968, Ser. No. 787,420
Int. Cl. A01m 23/02
U.S. Cl. 43—58                    3 Claims

ABSTRACT OF THE DISCLOSURE

A box or chamber has a top surface provided with an opening normally closed by a spring biased sliding lid. The chamber is used with an imprisoning type mouse trap that includes a bottom sliding door adapted to rest on the top surface of the chamber with a portion overlying an edge thereof. The chamber lid has a flanged portion which engages an end wall of the trap. When the trap is moved across the top surface of the chamber the bottom door remains fixed and the lid is moved to its open position to permit the mice to fall into the chamber.

---

The present invention relates to devices used for transporting and storing and dispatching pests such as rodents, particularly mice.

One of the most successful mouse traps available consists of a metal box with a provision for storing trapped mice in a compartment covered by a sliding door on one face of the trap. During the time the trap is in use, as many as 15 or 16 mice may be collected. The mice remain alive in the trap. Traps of this kind can be obtained, for example, from the Kness Manufacturing Co., Inc. of Albia, Iowa. One problem with these traps is that there has been no satisfactory and efficient way of collecting and disposing of the mice that have been caught.

In accordance with the present invention both the trap and the death chamber are provided with flat surfaces which contain door openings. The opening of the death chamber is normally closed by a lid and the opening in the trap is normally closed by a door. When pests are to be transferred from the trap to the death chamber, the flat surfaces with the door openings are placed adjacent one another. A means is operatively connected to both the lid and the door for simultaneously opening both the door and the lid when the door openings are in sufficient alignment to allow transfer of the pests from the trap to the chamber.

These and other more detailed and specific objects will become apparent from the following description of the invention and drawings wherein:

FIG. 1 is a perspective view of an apparatus embodying the invention.

FIG. 2 is a longitudinal vertical sectional view of the apparatus with a trap in the position taken immediately before the pests are transferred to the chamber.

FIG. 3 is a view similar to FIG. 2 with the trap in the position taken immediately after its contents have been transferred to the death chamber.

The invention will now be described in detail by reference to the figures. The death container or chamber 10 consists of a metal box having side walls 12, 14, 16 and 18, a bottom 20 and an inclined top wall 22 to which are affixed parallel longitudinally extending guides 24 and 26 of just sufficient width to accommodate a mouse trap 30 and to allow sliding movement of the mouse trap 30 in the direction indicated in FIG. 3 when mice contained in the trap are to be transferred to the death chamber 10. The death chamber 10 is provided with carrying handles 32 and 34 and a sliding lid 36 which is yieldably biased toward the closed position of FIGS. 1 and 2 by means of springs 38 and 40 that are secured at their left ends as seen in FIG. 1 to the top of the death chamber and at their right ends as seen in FIG. 1 to a flange 42 which forms a part of the lid 36. As can be seen in the figures, the axis of movement of the lid 36 between its open and closed position corresponds to and is parallel with the axes of the guides 24 and 26. The death chamber contains a poison or water 21 for dispatching the rodents.

The trap 30 is provided with a sliding door 31 adapted to slide longitudinally on the trap between the closed position of FIG. 2 and the open position of FIG. 3 when the mice are to be removed. The lid 36 of the death chamber is operatively engageable with the trap so as to move with the trap as the trap is moved from left to right as seen in FIG. 3 across the top of the death chamber. Similarly, the door 31 of the trap is engageable with the chamber and remains in the fixed position relative to the death chamber when the trap is moved from left to right across the top of the death chamber. In this way both the lid and the door are opened simultaneously thereby allowing the mice to transfer from the trap to the death chamber shown in FIG. 3.

As seen in FIG. 2 the lid 36 is provided with a lip 50 adapted to engage the right end of the trap 30 and the door 31 is provided with a tab 52 adapted to engage the left end of the death chamber 10 at 53. Accordingly, the trap when moved as indicated in FIG. 3 across the top of the death chamber will also move the lid 36 to the open position and the engagement between the tab 52 and the death chamber 10 will retain the door 31 in a fixed position relative to the death chamber thereby moving it also to the open position relative to the trap allowing mice or other pests to fall from the trap 30 into the death chamber 10.

It is apparent that many modifications and variations of this invention as hereinbefore set forth may be made without departing from the spirit and scope thereof.

I claim:
1. A death chamber for an animal trap having a sliding door, said death chamber comprising in combination an enclosure and a lid mounted thereon for sliding movement between open and closed positions, means for engaging the trap with the lid so that the lid remains in a fixed position relative to the trap, means for engaging the door upon the death chamber so as to retain the door in a fixed position relative to the death chamber when the trap is placed upon the death chamber so that the door is adjacent the top of the death chamber and the movement of the trap across the top of the death chamber being thereby adapted to slide the door and lid to an open position simultaneously whereby animals contained in the trap will fall into the death chamber.

2. The death chamber of claim 1 wherein the lid is yieldably biased towards a closed position.

3. The apparatus of claim 1 wherein the death chamber is provided with laterally spaced longitudinally extending parallel guide means of an appropriate size adapted to accommodate the trap for confining the movement of the trap across the top of the death chamber to a predetermined path corresponding to the axis of movement of the lid between its open and closed positions.

References Cited

UNITED STATES PATENTS

| 146,601 | 1/1874 | Marberry | 43—65 |
| 2,655,129 | 10/1953 | Miller | 43—58 X |

WARNER H. CAMP, Primary Examiner